United States Patent [19]

Hug et al.

[11] Patent Number: 4,933,816
[45] Date of Patent: Jun. 12, 1990

[54] INSPECTION/DETECTION SYSTEM WITH A LIGHT MODULE FOR USE IN FORENSIC APPLICATIONS

[76] Inventors: William F. Hug, 382 E. California Blvd., #106, Pasadena, Calif. 91106; Edward A. Reed, 1092 W. 17th St., Upland, Calif. 91786; Ray D. Reid, 1125 E. Foothill, #5, Glendora, Calif. 91740

[21] Appl. No.: 195,788

[22] Filed: May 19, 1988

Related U.S. Application Data

[63] Continuation-in-part of Ser. No. 20,695, Mar. 2, 1987, abandoned.

[51] Int. Cl.5 .............................................. F21V 8/00
[52] U.S. Cl. .................................... 362/32; 362/259; 362/294; 362/373; 128/4; 128/6; 372/6
[58] Field of Search ................. 362/32, 259, 294, 373; 128/4, 6; 372/6, 23, 33, 65, 61, 101, 108

[56] References Cited

U.S. PATENT DOCUMENTS

| | | | |
|---|---|---|---|
| 3,638,013 | 1/1972 | Keller | 362/32 |
| 3,733,481 | 5/1973 | Kuyt | 362/32 |
| 4,011,403 | 3/1977 | Epstein | 362/32 X |
| 4,123,172 | 10/1978 | French | 362/32 X |
| 4,337,502 | 6/1982 | Lescrenier | 362/259 X |
| 4,385,344 | 5/1903 | Gonser | 362/263 X |
| 4,757,426 | 7/1988 | Scheller et al. | 362/32 X |

Primary Examiner—Ira S. Lazarus
Assistant Examiner—Sue Hagarman
Attorney, Agent, or Firm—W. Edward Johansen

[57] ABSTRACT

An inspection/detection system is for use in forensic applications. The inspection/detection system includes a carrying case which has a cover-lid, a light module and a power supply module. The carrying case is a rectangular box with a closed end and an open end to which the cover-lid is hingedly coupled. The light module is mounted within the carrying case and has an output aperture. The light module may be an argon laser head. The power supply module is disposed within the carrying case and energizes the light module to generate light energy therefrom. The inspection/detection system also includes an optical connector and a shutter assembly. The optical connector is optically coupled to the output aperture. The shutter assembly is optically coupled to the optical connector. The inspection/detection system further includes a flexible optical fiber, a remote control handpiece and a heat exchanger. The flexible optical fiber cable is optically coupled to the optical connector. The remote control handpiece has a focusing lens and is optically coupled to the flexible optical fiber cable so that the light energy from the light module can be shined onto latent materials. The heat exchanger cools the light module and is disposed within the carrying case. The light energy from the light module causes the latent material to luminesce and becomes detectable.

1 Claim, 4 Drawing Sheets

INSPECTION/DETECTION SYSTEM WITH A LIGHT MODULE FOR USE IN FORENSIC APPLICATIONS

This is a continuation-in-part of an application, filed Mar. 2, 1987, having Ser. No. 020,695, now abandoned.

BACKGROUND OF THE INVENTION

1. Field of the Invention

The present invention relates to an inspection/detection system for use in forensic applications and more particularly to an inspection/detection system which has a light module and which is not only portable and lightweight so that the inspection/detection system may be utilized at field sites, but which also does not require skilled personnel to operate and adjust thereby reducing the complexity and operating cost thereof.

2. Description of the Prior Art

In OE Reports, which is the International Newspaper of Optical and Optoelectronic Applied Science and Engineering, Number 49, published by the Society of Photo-Optical Instrumentation Engineers in January 1988 beginning on page 1 there is an article, entitled "Laser Detection: Scotland Yard's High Tech Crime Fighting Techniques", by K. E. Creer. Creer described Scotland Yard's use of ultraviolet light and fluorescence. U.S. Pat. No. 4,504,408, entitled Fluorescent Vapor Fumes for Use with a Self-contained Fingerprinting Kit, issued to William P. Morton on Mar. 12, 1985, teaches a vapor phase activator pad which produces fluorescent fumes for use in fuming an object, which is suspected of containing in an enclosed area latent fingerprints. An ultraviolet light is shined on the fumed object to expose the latent fingerprints.

Creer also described Scotland Yard's use of the Neodymium:YAG laser system. U.S. Pat. No. 4,507,789, entitled YAG Laser System, issued to Richard T. Daly on Mar. 26, 1985, teaches a reliable, lightweight low cost YAG laser system which includes a resonator cavity which is disposed inside a housing, a power supply unit and a cooling system for cooling the resonator cavity. The power supply unit is electrically coupled to the resonator cavity and is disposed outside the housing.

An inspection/detection system recently marketed by Cooper LaserSonics Inc. is directed to forensic applications. The inspection/detection system includes a laser system with an argon laser head and is adapted for use at field sites. However, the inspection/detection system is relatively heavy weighing approximately 120 pounds and consists of at least three separate subassemblies which must be reassembled at the field site before it can be utilized. The inspection/detection system needs frequent adjustments and cleaning and requires the services of skilled maintenance personnel thereby adding to the operating costs thereof.

Creer further described an inspection/detection system which includes a light module having a laser head and which is a portable and lightweight. The gas which is used in the laser head may be argon. The inspection/detection system also includes a power supply module, a heat exchanging assembly, an optical fiber connector, a shutter assembly, a flexible optical fiber cable and a remote control handpiece with beam control optics. Certain wavelengths of light energy which the light module produces cause latent materials, such as fingerprints, seminal stains and certain processed fibers to luminesce so that they become detectable. Argon laser system have not been incorporated into inspection/detection systems for use in a non-stationary, field environment.

U.S. Pat. No. 4,230,902, entitled Modular Laser Printing System, issued to William F. Hug and Leonard C. De Benedict on Oct. 28, 1980, teaches a laser printing system which includes a laser module which is replaceable. However, the laser printing system is not portable in the sense that the laser printing system is not designed to be moved to different sites. Argon laser systems have found wide use in centralized laser printing systems. Argon laser module have not been used in a stand-alone inspection/identification system.

U.S. Pat. No. 3,471,215, entitled Fiber Laser Device Provided with Long Flexible Energy-Directing Probe-like Structure, issued to Elias Snitzer on Oct. 7, 1969, teaches a fiber laser device which includes a laser which generates light energy and a thin, long, flexible readily manipulatable fiber for redirecting the laser energy as a beam of small controlled size onto hard-to-reach parts of body cavities.

U.S. Pat. No. 4,011,403, entitled Fiber Optic Laser Illuminators, issued to Max Epstein and Michael E. Marhic on Mar. 8, 1977, teaches an object-illuminating and imaging system which utilizes, in combination, laser beam as a light source and an optical fiber as a light transmitter. Film may be used usually to reproduce illuminated object U.S. Pat. No. 4,114,112, entitled Apparatus and Method for Efficient Synthesis of Laser Light, issued to Max Epstein, Michael E. Marhic and Samuel E. Schacham on Sept. 12, 1978, teaches an apparatus synthesizing laser light which is characterized by a plurality of discrete wavelengths.

U.S. Pat. No. 4,681,396, entitled High Power Laser Energy Delivery System, issued to Marshall G. Jones on July 21, 1987, teaches a quartz optical fiber to a spot having a size smaller than the fiber diameter and with a beam cone angle less than twice the numerical aperture of the fiber. The fiber transmits the light energy from Neodymium:YAG laser system to emerge at the other end where the light energy is collimated and focused onto material to be processed.

U.S. Pat. No. 3,647,275, entitled Identification System using Reference Beam Coded Holograms, issued to John H. Ward on Mar. 7, 1972, teach an identification system which identifies persons, articles, documents. U.S. Pat. No. 3,704,949, entitled Method and Apparatus for Personal Identification, issued to Carlton E. Thomas and Gary D. Cochran on Dec. 5, 1972, teaches an apparatus which creates an encoded fingerprint card which consists of a hologram of a fingerprint. U.S. Pat. No. 4,627,068, entitled Fiber Optics Interface for a Dye Laser Oscillator and Method, issued to Steve A. Johnson on Dec. 2, 1986, teaches a dye laser oscillator. U.S. Pat. No. 3,716,301, entitled Fingerprint Identification Apparatus, issued to Henry John Caulfield and Dean Roger Perkins on Feb. 13, 1973, teaches a coherent optical processor fingerprint identification apparatus in which identification is established by correlating an optical beam pattern representative of the finger to be identified with a prerecorded Fourier transform spatial filter of the fingerprint. The aforementioned patents disclose fingerprint identification techniques. The laser systems which are utilized are known as stationary laser systems in that the laser systems are fixed and are not for use in the field. In forensic applications, this restriction severely limits the use of a laser system for on-site crime investigation.

SUMMARY OF THE INVENTION

In view of the foregoing factors and conditions which are characteristic of the prior art it is the primary object of the present invention to provide an inspection/detection systems for use in forensic applications which has a light module which includes a laser head which uses argon gas.

It is another object of the present invention to provide an inspection/detection systems for use in forensic applications which is portable and lightweight so that the inspection/detection system may be utilized at field sites.

It is still another object of the present invention to provide an inspection/ detection systems for use in forensic applications which does not require skilled personnel to operate and adjust thereby reducing the complexity and operating cost thereof.

In accordance with an embodiment of the present invention an inspection/detection system for use in forensic applications is described. The inspection/detection system includes a carrying case which has a cover-lid, a light module and a power supply module. The carrying case is a rectangular box with a closed end and an open end to which the cover-lid is hingedly coupled. The light module is mounted within the carrying case and includes a laser head which uses argon gas and has an output aperture. The power supply module is disposed within the carrying case and energizes the light module to generate light energy therefrom. The inspection/detection system also includes an optical connector and a shutter assembly. The optical connector is optically coupled to the output aperture. The shutter assembly is optically coupled to the optical connector. The inspection/detection system further includes a flexible optical fiber, a remote control handpiece and a heat exchanger. The flexible optical fiber cable is optically coupled to the optical connector. The remote control handpiece has a focusing lens and is optically coupled to the flexible optical fiber cable so that the light energy from the light module can be shined onto latent materials. The heat exchanger cools the light module and is disposed within the carrying case. The light energy from the light module causes the latent materials to luminesce and become detectable.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
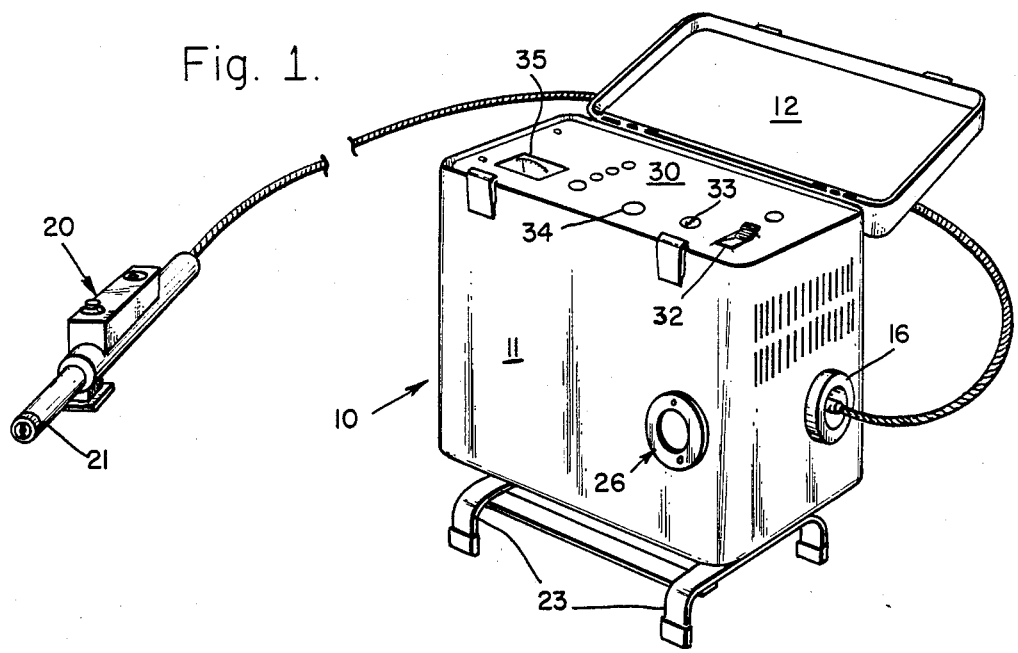
FIG. 1 is a perspective view of a first inspection/detection system for use in forensic applications which has a first control panel and which has been constructed in accordance with the principles of a first embodiment of the present invention.
Figure 2:
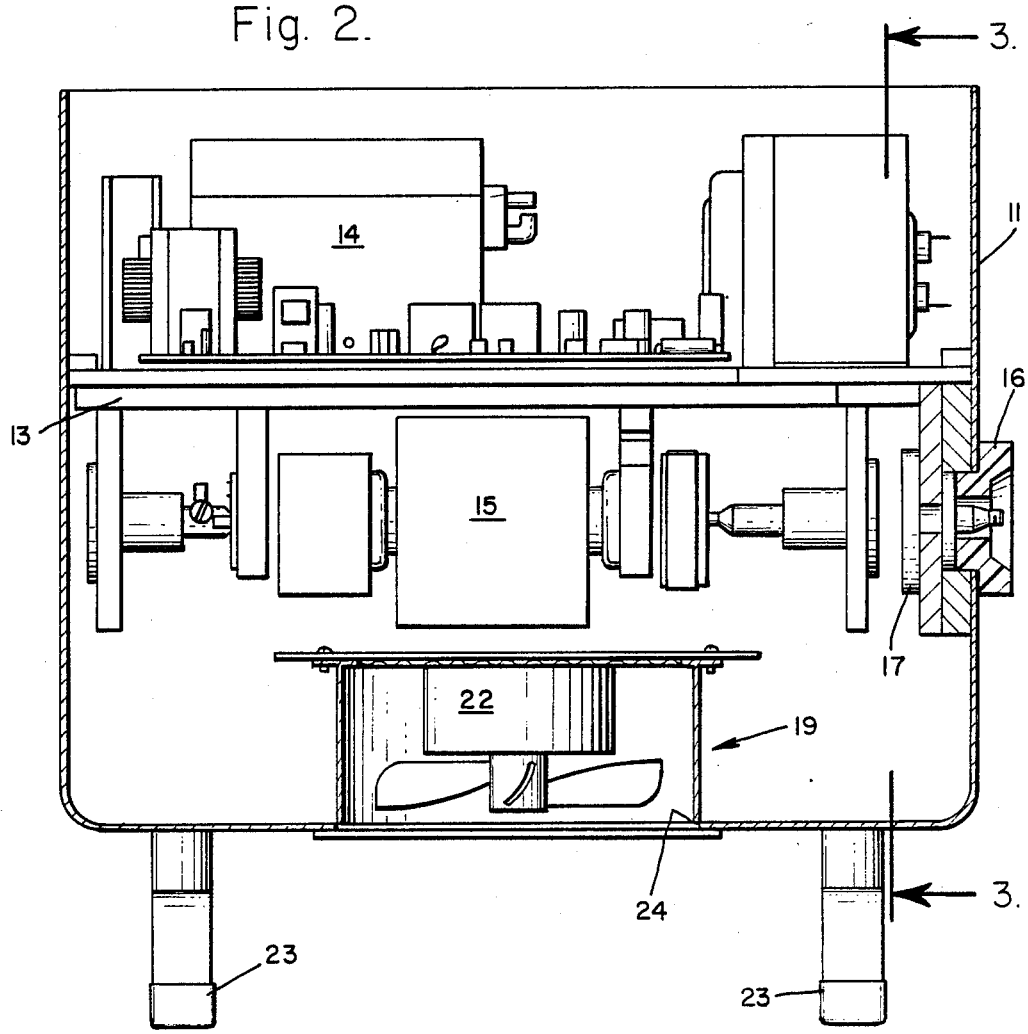
FIG. 2 is a front elevational view in cross-section of the first inspection/detection system of FIG. 1 which includes a first power supply module and a first light module.
Figure 3:
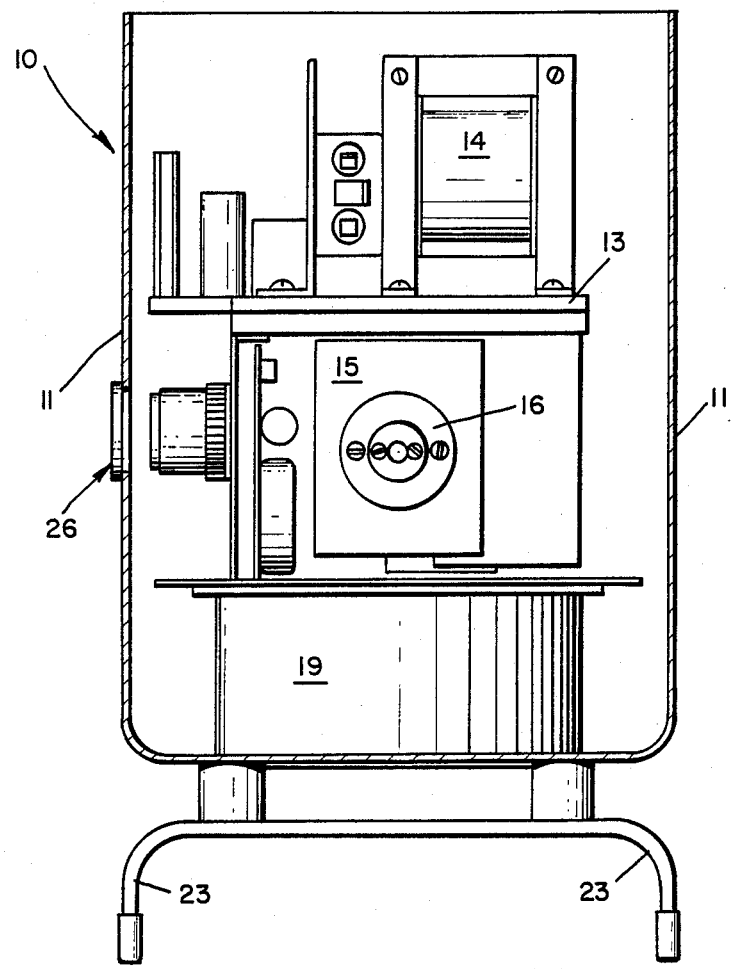
FIG. 3 is a left-side elevational view in cross-section of the first inspection/detection system of FIG. 1 taken along line 3—3 of FIG. 2.

In order to best understand the present invention it is necessary to refer to the following description of its preferred embodiment in conjunction with the accompanying drawing. Referring to FIG. 1 in conjunction with FIG. 2 and FIG. 3 a first inspection/detection system 10 for use in forensic applications includes a first carrying case 11 which has a first cover-lid 12, a first base plate 13, a first power supply module 14 and a first light module 15. The first carrying case 11 is a rectangular box with a is hingedly coupled. The first light module 15 is disposed within the first carrying case 11 and is mounted on the first base plate 13. The first light module 15 has an output aperture. The first power supply module 14 is disposed within the first carrying case 11 and is mounted on the first base plate 13. The first power supply module 14 energizes the first light module 15 to generate light energy therefrom. The first inspection/detection system 10 also includes a first optical connector 16 and a shutter assembly 17. The first optical connector 16 is optically coupled to the output aperture of the first light module 15. The shutter assembly 17 is optically coupled to the first optical connector 16. The first inspection/detection system 10 further includes a first flexible optical fiber cable 18, a first heat exchanger 19 and a first remote control handpiece 20. The first flexible optical fiber cable 18 is optically coupled to the first optical connector 16. The first remote control handpiece 20 has a first focusing lens 21 and is optically coupled to the first flexible optical fiber cable 18 so that the light energy from the first light module 15 can be shined onto latent materials. The first heat exchanger 19 includes a first cooling fan 22 in order to cool the first light module 15 and is disposed within the first carrying case 11. The first light module 15 is a laser head which uses a laser gas, such as Argon, Krypton or Helium-Cadmium. The light energy from the first light module 15 causes the latent materials to luminesce and become detectable. The first carrying case 11 includes a first stand 23 which is mechanically coupled to its base and has a first cooling slot 24 in its base adjacent to the first cooling fan 22 so that cool air can circulate in order to cool the first light module 15. There is a power cord socket 26 which is disposed on the front sidewall of the first carrying case 11 and which electrically couples a power cord to the first power supply module 14.

Figure 4:
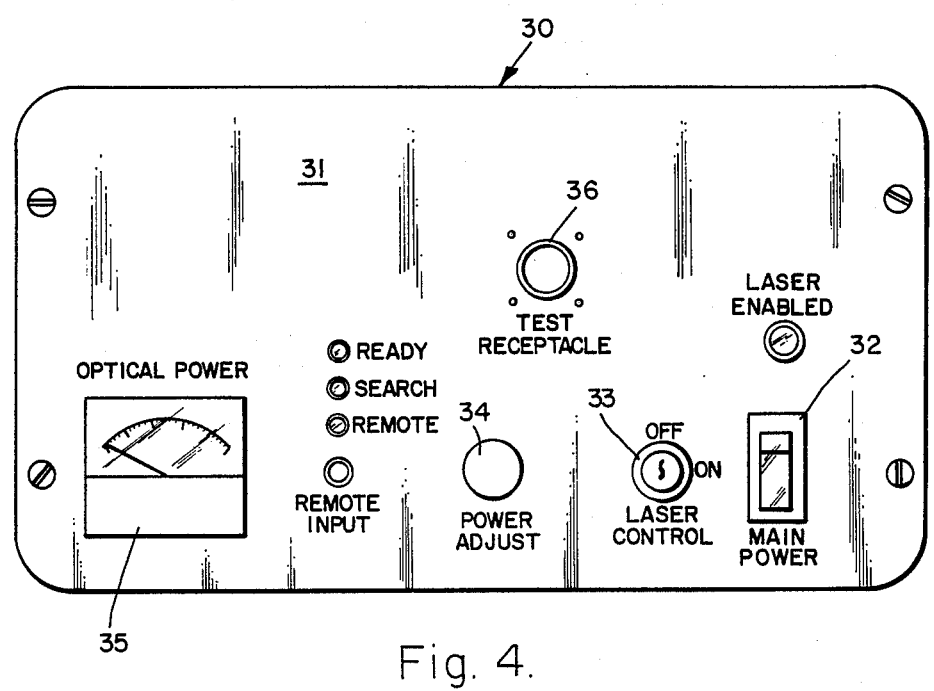
FIG. 4 is a top plan view of the first control panel of the first inspection/detection system of FIG. 1.

Referring to FIG. 4 the first inspection/detection system 10 also includes a first control panel 30 which include a first panel plate 31, a first main power switch 32, a laser on/off control key switch 33, a power adjust knob 34, an optical power meter 35 and test receptacle 36.

Figure 5:
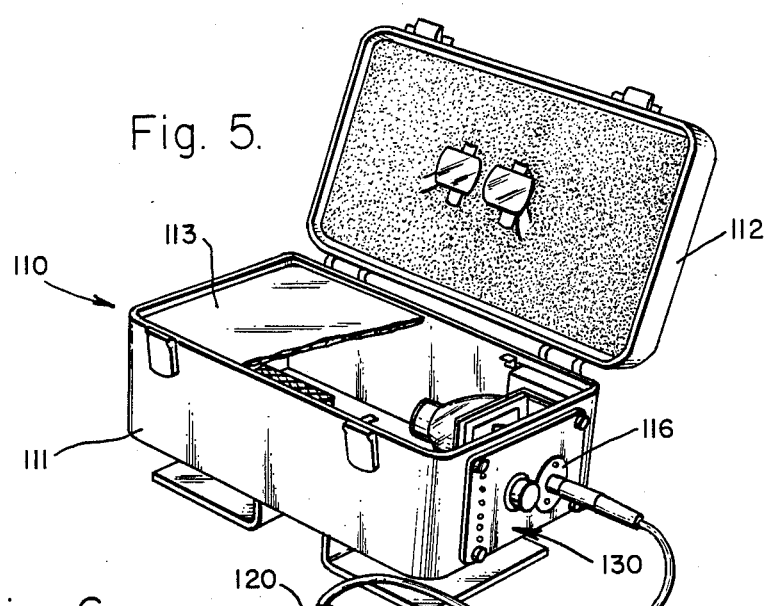
FIG. 5 is a perspective view of a second inspection/detection system for use in forensic applications which has a second control panel and which has been constructed in accordance with the principles of a second embodiment of the present invention.
Figure 6:
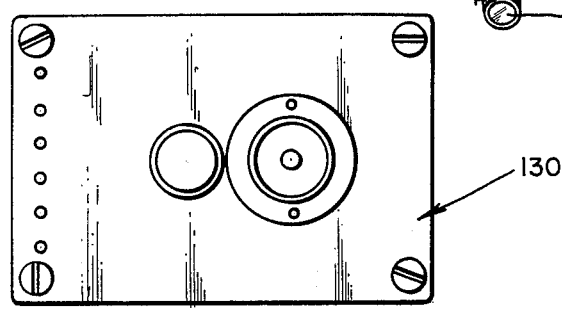
FIG. 6 is a side elevation view of the second control panel of the second inspection/detection system of FIG. 2.
Figure 7:
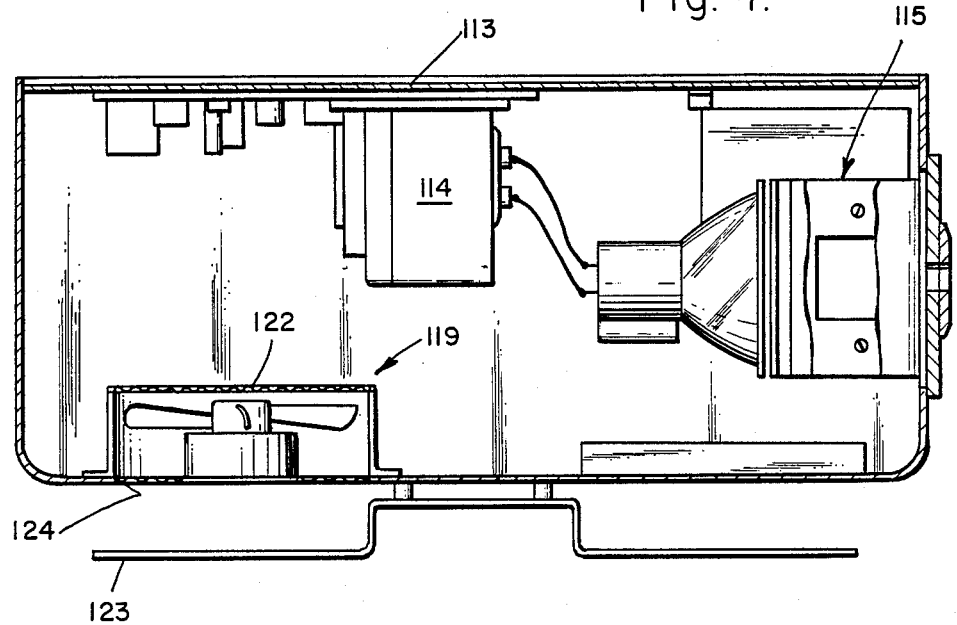
FIG. 7 is a front elevational view in cross-section of the second inspection/detection system of FIG. 5 which includes a second power supply module and a second light module having a light bulb assembly and a notch filter.

Referring to FIG. 5 in conjunction with FIG. 6 and FIG. 7 a second inspection/detection system 110 for use in forensic applications includes a second carrying case 111 which has a second cover-lid 112, a second base plate 113, a second power supply module 114 and a second light module 115. The second carrying case 111 is a rectangular box with a closed end and an open end to which the second cover-lid 112 is hingedly coupled. The second light module 115 is disposed within the second carrying case 111 and is mounted on the second base plate 113. The second light module 115 has an output aperture. The second power supply module 114 is disposed within the second carrying case 111 and is mounted on the second base plate 113. The second power supply module 114 energizes the second light module 115 to generate light energy therefrom. The second inspection/detection system 110 also includes a second optical connector 116. The second optical connector 116 is optically coupled to the output aperture of the second light module 115. The second inspection/detection system 110 further includes a second flexible optical fiber cable 118, a second heat exchanger 119 and a second remote control handpiece 120. The second flexible optical fiber cable 118 is optically coupled to the second optical connector 116. The second remote control handpiece 120 has a second focusing lens 121 and is optically coupled to the second flexible optical fiber cable 118 so that the light energy from the second light module 115 can be shined onto latent materials. The second heat exchanger 119 includes a second cooling fan 122 in order to cool the second light module 115 and is disposed within the second carrying case 111. The second carrying case 111 includes a second stand 123 which is mechanically coupled to its base and has a second cooling slot 124 in its base adjacent to the first cooling fan 122 so that cool air can circulate in order to cool the second light module 115. A second control panel 130 is electrically coupled to the second power supply module 114.

Figure 8:
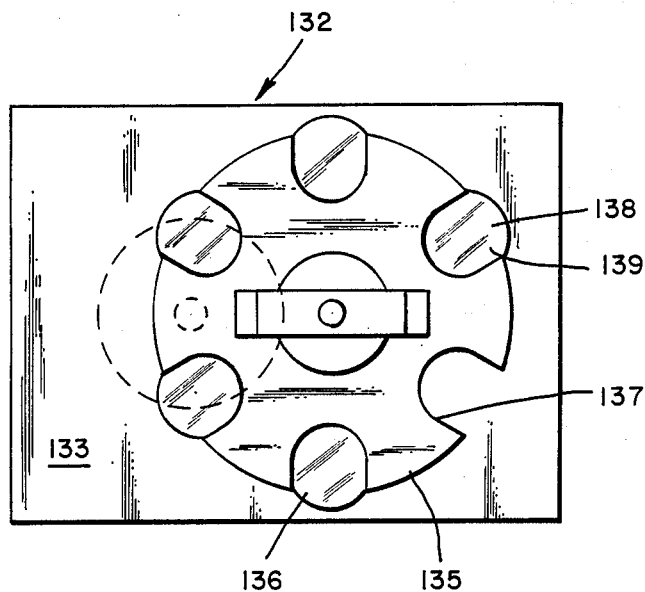
FIG. 8 is a rear elevation view of the notch filter of FIG. 7.
Figure 9:
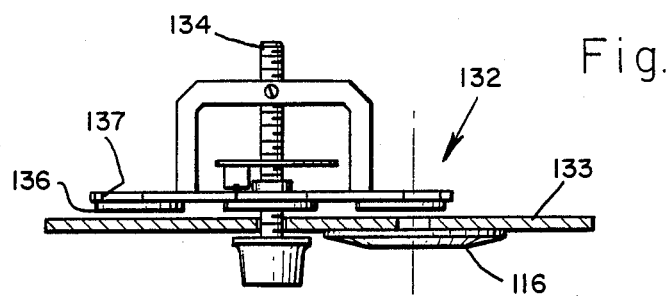
FIG. 9 is a top plan view of the notch filter of FIG. 7.

Referring to FIG. 8 in conjunction with FIG. 7 and FIG. 9 the second light module 115 includes a high intensity Xenon arc gas lamp assembly 131, a notch filter assembly 132. Selected metal vapor are used as additives in order to enhance the spectral output content of the light energy within the visible range of the high intensity Xenon arc gas lamp assembly 131. The notch filter assembly 132 includes a a mounting plate 133, a shaft 134, a wheel 135 and a plurality of notch filters 136. The wheel 135 is axially aligned with and fixedly coupled to the shaft 134 and has a plurality of filter mounts 137 which are adjacent to its peripheral edge. The shaft 134 is rotatably coupled to the mounting plate 133. Each notch filter 136 is composed of a low band filter 138 and a high band filter 139 and provides a high resolution, tunable output of light energy. Each notch filter 136 is disposed within one of filter mounts 137. The notch filter assembly 132 may be replaced by a fine line diffraction grating in order to provide a high resolution, tunable output of light energy. The light energy from the second light module 115 causes the latent materials to luminesce and become detectable.

Figure 10:
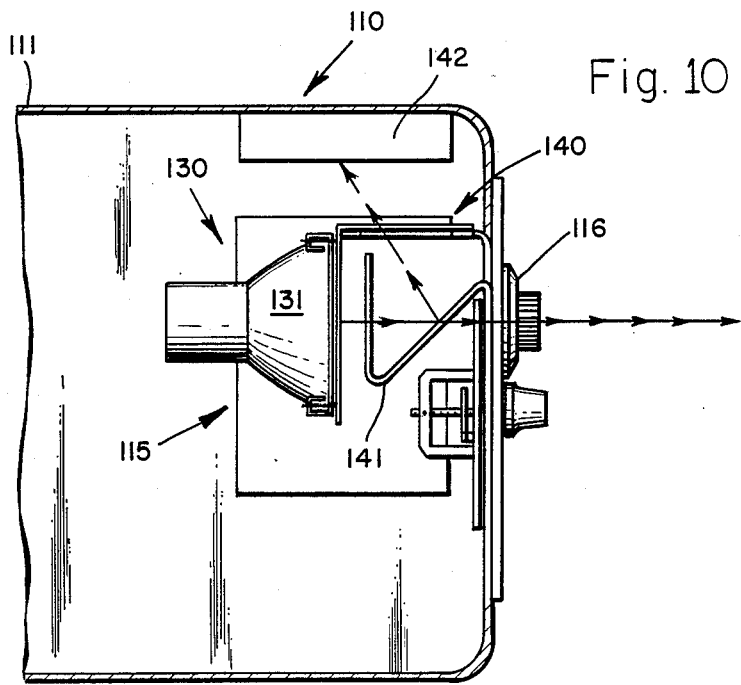
FIG. 10 is a top plan view of the second light module of FIG. 7.

Referring to FIG. 5 in conjunction with FIG. 7 and FIG. 10 the second light module 115 also includes a cooling assembly 140 having an infrared reflecting lens 141 and an energy absorber pad 142. The infrared reflecting lens 141 reflects into the energy absorber 142 light energy within the infrared spectrum and transmits light energy within the visible spectrum and an energy absorber pad 142.

From the forgoing it an be seen than an inspection/detection system has been described. It should be noted that distances of and between the figures are not to be considered significant.

Accordingly it is intended that the foregoing disclosure and showing made in the drawing shall be considered only as an illustration of the principles of the present invention.

What is claimed is:

1. An inspection/detection system for use in forensic applications, said inspection/detection system comprising:
   a. a carrying case having a cover-lid and being a rectangular box with a closed end and an open end to which said cover-lid is hingedly coupled;
   b. a high intensity lamp assembly which generates light energy of multiple wavelengths within the visible spectrum and infrared spectrum, said high intensity lamp assembly having an output aperture and being mounted within said carrying case;
   c. a power supply unit being mounted within said carrying case, said power supply energizing said high intensity lamp assembly to generate light energy therefrom;
   d. an optical connector being optically coupled to said output aperture of said high intensity lamp assembly;
   e. a flexible optical fiber cable being optically coupled to said optical connector;
   f. a mounting plate which is fixedly coupled to said carrying case;
   g. a shaft is rotatably coupled to said mounting plate;
   h. a wheel has a plurality of filter mounts which are adjacent to its peripheral edge and is axially aligned with and fixedly coupled to said shaft; and
   i. a plurality of notch filters each of which is disposed within one of said filter mounts and is composed of a low band filter and a high band filter in order to provide a plurality of selectable high resolution outputs of light energy, a selectable one of said notch filters being optically connected to said optical connector in order to filter out all of said light energy which is not inside a narrow wavelength band in order to provide an output of light energy of high resolution;
   j. a remote control handpiece having beam control optics and being optically coupled to said flexible optical fiber cable so that said output of light energy of high resolution can be shined onto a material; and
   k. a cooling assembly which includes an infrared reflecting lens and an energy absorber pad therein said infrared reflecting lens reflects into said energy absorber pad all of said light energy which is within the infrared spectrum and transmits all of said light within the visible spectrum in order to cool said case so that said output of light energy of high resolution causes the material to luminesce and become detectable.

* * * * *